May 17, 1938.     F. G. G. ARMSTRONG     2,117,644
HYDRAULIC SHOCK ABSORBER OR THE LIKE DAMPING MEANS
Filed Oct. 16, 1936     3 Sheets-Sheet 1
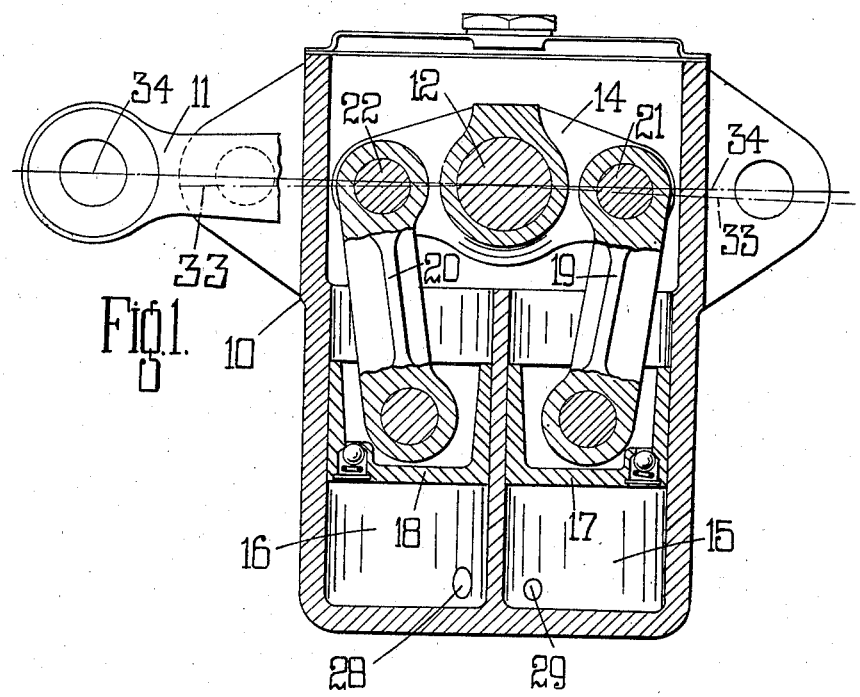
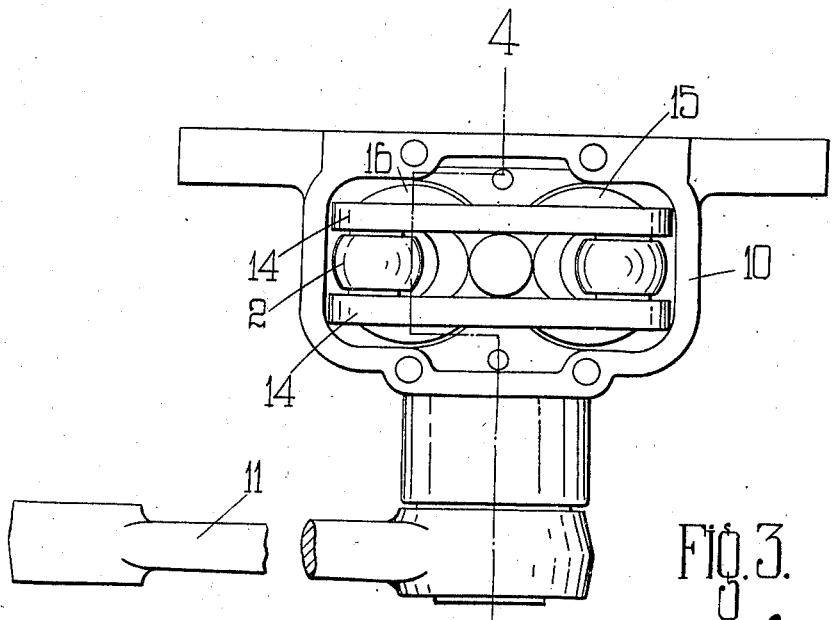

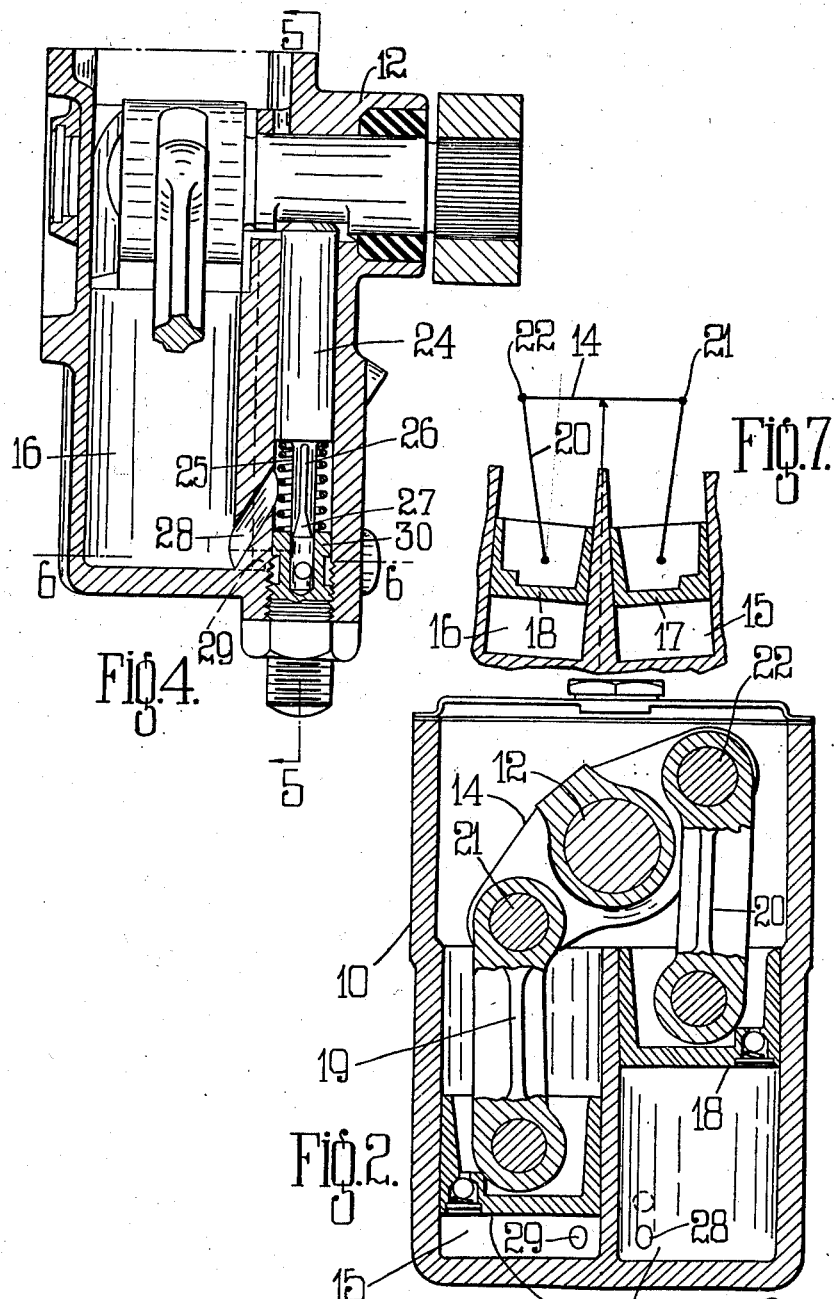

May 17, 1938.  F. G. G. ARMSTRONG  2,117,644
HYDRAULIC SHOCK ABSORBER OR THE LIKE DAMPING MEANS
Filed Oct. 16, 1936   3 Sheets-Sheet 3

Inventor:
Fullerton G. G. Armstrong
By: Mason & Porter
Attorneys

Patented May 17, 1938

2,117,644

UNITED STATES PATENT OFFICE 2,117,644

HYDRAULIC SHOCK ABSORBER OR THE LIKE DAMPING MEANS

Fullerton George Gordon Armstrong, Beverley, England, assignor to Armstrong's Patents Company Limited, Beverley, East Yorkshire, England Application October 16, 1936, Serial No. 106,060
In Great Britain June 30, 1936

1 Claim. (Cl. 188—88)

The present invention relates to hydraulic shock absorbers and the like differential pressure operated damping means of the type wherein one or more restricted passages form a resistance to fluid flow between the cylinders of a pair of pistons or plungers on longitudinal displacement of the latter, under the control of an angularly displaceable lever or crank having link connections at its ends with the pistons.

In constructions of this type substantial equality of displacement of the pistons in opposite directions for all practical purposes is obtained when the pivotal centers of the connecting rods or links on the crank or lever lie in a straight line passing through the axis of angular displacement of the crank, and the distance between the axes of longitudinal displacement of the pistons is equal to that between said pivotal centers. As a result it is impossible for one piston on that part of its working stroke between its center of displacement and the position consistent with completion of such stroke to be displaced by any appreciably greater amount, consistent with practical requirements, than the other piston which during this period is completing that part of its stroke between the center of displacement and a position consistent with the end of its suction stroke or in other words one piston cannot build up a pressure appreciably in excess of that which the other piston is required to relieve.

This important advantage, however, is nullified by the fact that as the crank or lever approaches either end of its angular displacement the angle between it and the connecting rods or links more rapidly approaches 180° in one case and 0° in the other and the piston displacement per unit angular displacement of the crank is reduced.

The object of the present invention is to overcome this difficulty whilst retaining the recited advantage and accordingly by this invention the effective length of the crank or lever between its pivotal centers for the connecting rods is increased so as to make this greater than the distance between the axes of displacement of the pistons and thus eliminate that range of displacement of the crank where it approaches a straight line position with its connecting rods, whilst to ensure symmetry of movement of the pistons on opposite sides of their mid-positions of displacement, either the pivots of the connecting rods on the crank are brought nearer the pistons so that the pivotal centers instead of lying on a straight line passing through the axis of the crank lie on the ends of a bell crank or the pivots are maintained in a straight line passing through the axis of a crank and the cylinders instead of lying parallel to one another are disposed at a small angle to their plane of symmetry.

In other words the effective length of the crank on each side of its center of angular displacement is greater than the spacing apart of the axes of the pistons from their common axis of symmetry, whilst a small angle is formed either between the crank and a plane normal to said axis of symmetry or between the said axis of symmetry and the separate axes of the pistons.

Where the pivotal centers are displaced towards the pistons the adjustment of the pivotal centers is by an amount which is less than that which would be required to produce a right angle between the crank and each connecting rod when the pistons are in their mid-position, whilst again the angular displacement of the crank preferably but not essentially is limited to the traverse of an arc which subtends an angle not greater than 45° on each side of its mid-position.

The invention is more particularly described with reference to the accompanying drawings, in which:—

Figure 1 is a vertical sectional view through a hydraulic shock absorber of the present invention showing one half thereof and with the pistons in their normal positions i. e., centrally of the ends of their strokes.

Figure 2 is a sectional view of a shock absorber showing the other half thereof and with the pistons at the opposite ends of their strokes.

Figure 3 is an external plan view.

Figure 4 is a vertical section on the line 4—4 of Fig. 3.

Figure 7 is a diagrammatic view of a modified form of cylinder construction.

Figure 5:
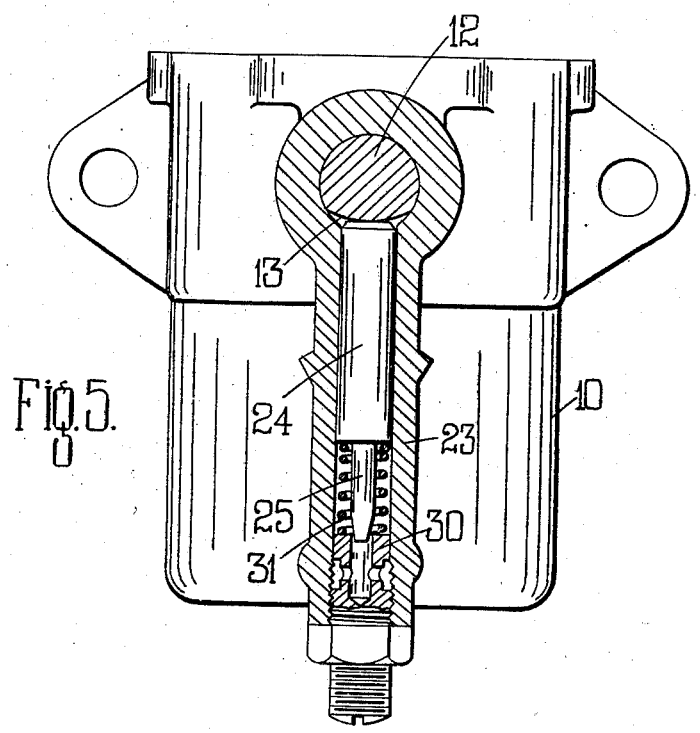
Figure 5 is a vertical section on the line 5—5 of Fig. 4.
Figure 6:
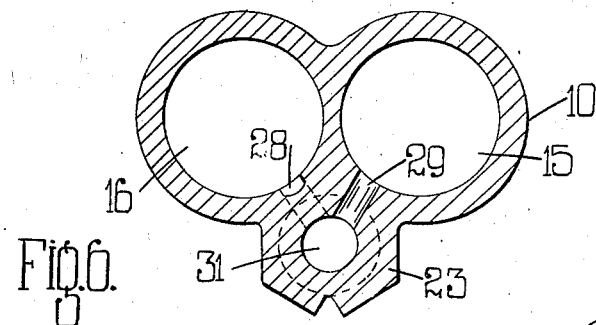
Figure 6 is a horizontal section on the line 6—6 of Fig. 4.

In the construction according to Figures 1–6 of the drawings a shock absorber casing 10 is adapted for connection to the chassis of a motor or other vehicle whilst a lever 11 adapted for link connection with an axle of the vehicle on which it is mounted is rigid with a shaft 12 which has a cam face 13 thereon, and carries a crank 14, in the form of a pair of arms or levers of the first order, for angular displacement with the shaft. A pair of cylinders 15, 16, are formed in the casing within which pistons 17, 18 respectively reciprocate on angular displacement of the shaft 12 and crank 14, the pistons having link connections 19, 20 respectively with said crank for this purpose.

A boss 23 extending longitudinally of the casing is internally bored at 31 to receive a tapered needle valve which comprises a spindle 24 and a relatively thin shank 25, the latter of which has opposed flat faces 26 and tapered flat faces 27 at its free end. The valve spindle 24 is maintained in contact with the cam surface 13 on the shaft 12 by means of a spring 24a disposed within the bore 31. This tapered needle valve controls a pair of passages 28, 29 between the bore and the cylinders 15, 16 and is displaceable longitudinally of the bore in strict accordance with angular displacement of the cam face 13 on the shaft 12 to vary the cross sectional area through a valve port 30. The valve port 30 establishes connection between the passages 28 and 29, in that it is located in that part of the bore 31 which is bounded by the planes in which the passages 28, 29 merge into the bore.

It will thus be seen that on relative displacement of the elements to be damped by the shock absorber which in the case of a vehicle comprises a vehicle axle and the chassis, the shaft 12 is angularly displaced to angularly displace the crank about the axis of the shaft and thus cause reciprocation of the pistons 17, 18 in their respective cylinders 15, 16. As a result oil or other liquid is forced out of one cylinder into the other. When the piston 17 is on its compression stroke the oil is forced out of the passage 29 through the port 30 past the valve 25 into the bore 31 and through the passage 28 into the other cylinder 16 whilst when the piston 18 is on its compression stroke, the oil is forced in the reverse direction. In either direction of flow the resistance to flow is varied in strict accordance with the displacement of the pistons by virtue of the cam surface 13 which moved the valve 25 towards and away from the port 30 in accordance with rotation of the shaft 12.

When the distance between the pivots 21, 22, of the crank 14 is similar to the transverse distance between the separate axes of reciprocation of the pistons 17, 18, there is no appreciable difference in the longitudinal displacements of the pistons 17, 18, that is to say the piston 17 moves downwardly from its mid-position to the end of its compression stroke by an amount substantially equal to the upward movement of the piston 18 and vice versa. This similarity of length of crank and distance apart of the axes of symmetry of the pistons leads, however, to a disadvantage in that when the crank 14 is angularly displaced from its normal position by an appreciable amount it tends to assume a straight line with one of the links 19, 20 before the corresponding piston has reached the end of its compression stroke and as a result with successive equal arcs of movement of the crank 14 the pistons 17, 18 during compression have imparted to them gradually decreasing ranges of movement, so much so that when the pistons approach the end of their compression strokes their displacement is relatively small per unit displacement of the crank as compared with their displacement when in the region of their normal positions.

By this invention the distance between the pivots 21, 22, on the crank 14 is greater than the distance between the axes of longitudinal displacement of the pistons and in order to prevent any appreciable difference between the downward displacement of one piston and the corresponding upward displacement of the other piston consequent upon increasing the length of the crank 14, the centers of the pivot pins 21, 22, are dropped from the horizontal plane containing the center of rotation of the shaft 21 by a small amount so that the angle taken up by a line 33 joining the center of either pivot 21 or 22, with the axis of the shaft 12 is at an angle of between 1° and 6° with a horizontal plane 34 through said axis of rotation of the shaft 12 when the various elements, namely the crank, the links, the pistons and the cylinders, are in the same proportion as that illustrated in the drawings.

As an example when each arm of the bell crank is 15/16ths of an inch in length, that is, the distance apart of the centers of the pivots 21, 22, is 1 11/16ths of an inch the parallel axes of longitudinal displacement of the pistons are 1 9/16ths of an inch apart and the connecting links 19, 20 are substantially 1 3/4 inches long, the pivotal centers of the links 19, 20 with the crank 14 are dropped towards the pistons from the horizontal plane 34 containing the axis of rotation of the shaft 12 by approximately 9/100ths of an inch to form an angle of substantially 3 1/2° between the horizontal plane 34 through the axis of rotation of the shaft 12 and lines 33 joining said axis at the centers of the pivots 21, 22.

In the modified form of construction illustrated in Figure 7 the pivots 21, 22, lie in the horizontal plane of angular displacement of the shaft but in this construction the longitudinal axes of displacement or the axes of symmetry of the individual pistons 17, 18 are inclined to one another and to an intermediate and vertical plane of symmetry 32 of the cylinders as a unit, the said angle being similar to that of the angle referred to in the construction according to Figures 1–6, that is to say it is approximately 3 1/2° when the measurements are those previously given but is generally between 1° and 6° according to variation in length of the various parts.

From the foregoing description, it will be seen that the links 19, 20 engage the arms of the crank 14 at such points that equal displacement of the pistons in opposite directions is insured. In other words, the links are connected to the crank at points so disposed with respect to a plane passing through the axis of the shaft 12 and intersecting the axes of the cylinders 17, 18 at the same angle when the pistons are at the centers of their strokes, as to insure equal displacement of the pistons in opposite directions upon oscillation of the shaft.

I declare that what I claim is:—

Differential pressure operated damping means for a pair of relatively displaceable members, comprising a casing adapted to be connected to one of said members, a pair of parallel cylinders within said casing, pistons reciprocable in said cylinders, valve controlled conduits between said cylinders, a shaft connected to the other of said members, a crank rigidly connected to said shaft for angular displacement in unison therewith, and links pivotally connected to said crank and serving to connect said crank with said pistons, the centers of the pivotal connections between said crank and said links being disposed at points spaced apart a greater distance than the spacing apart of the longitudinal axes of said cylinders and only slightly below a plane which passes through the axis of said shaft and which intersects the axes of said cylinders at right angles when the pistons are at the centers of their strokes so as to insure equal displacement of said pistons in opposite directions upon oscillation of said shaft.

FULLERTON GEORGE
GORDON ARMSTRONG.